US012771790B2

(12) United States Patent
Ohhata et al.

(10) Patent No.: US 12,771,790 B2
(45) Date of Patent: Oct. 20, 2026

(54) IMAGE PROCESSING APPARATUS, CONTROL METHOD, AND NON-TRANSITORY COMPUTER-READABLE RECORDING MEDIUM

(71) Applicant: KONICA MINOLTA, INC., Tokyo (JP)

(72) Inventors: Akira Ohhata, Toyokawa (JP); Kazuhiro Ishiguro, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 307 days.

(21) Appl. No.: 18/761,739

(22) Filed: Jul. 2, 2024

(65) Prior Publication Data

US 2025/0023989 A1 Jan. 16, 2025

(30) Foreign Application Priority Data

Jul. 12, 2023 (JP) ................................ 2023-114335

(51) Int. Cl.
*H04N 1/00* (2006.01)
*H04N 1/44* (2006.01)

(52) U.S. Cl.
CPC ..... *H04N 1/00013* (2013.01); *H04N 1/00005* (2013.01); *H04N 1/0001* (2013.01); *H04N 1/0009* (2013.01); *H04N 1/00875* (2013.01); *H04N 1/444* (2013.01); *H04N 1/4473* (2013.01)

(58) Field of Classification Search
CPC ........... H04N 1/00013; H04N 1/00005; H04N 1/0001; H04N 1/0009; H04N 1/00875; H04N 1/444; H04N 1/4473
See application file for complete search history.

(56) References Cited

U.S. PATENT DOCUMENTS

2008/0313744 A1* 12/2008 Nakajima ............ G06F 21/608 726/28

FOREIGN PATENT DOCUMENTS

| | | |
|---|---|---|
| JP | 2000040082 A | 2/2000 |
| JP | 2006229709 A | 8/2006 |
| JP | 2008310448 A | 12/2008 |
| JP | 2018098538 A | 6/2018 |
| JP | 2018142881 A | 9/2018 |

* cited by examiner

*Primary Examiner* — Christopher Wait
(74) *Attorney, Agent, or Firm* — Buchanan Ingersoll & Rooney PC

(57) ABSTRACT

An image processing apparatus includes an image reading section for reading an image of a document to generate image data including image abnormality, and a hardware processor. The hardware processor performs the following processing: Transmitting the image data to an external apparatus; determining whether or not the image data includes confidential information; when it is determined that the image data includes confidential information, saving the image data in a predetermined storage section without transmitting the image data to the external apparatus; and when the image data is saved in the storage section, transmitting access information for accessing the image data saved in the storage section to the external apparatus.

13 Claims, 9 Drawing Sheets

IMAGE PROCESSING APPARATUS, CONTROL METHOD, AND NON-TRANSITORY COMPUTER-READABLE RECORDING MEDIUM

CROSS REFERENCE TO RELATED APPLICATIONS

The present application is based on Japanese Patent Application No. 2023-114335 filed on Jul. 12, 2023, the contents of which are incorporated herein by reference.

BACKGROUND OF THE INVENTION

Technical Field

The present invention relates to an image processing apparatus, a control method, and a non-transitory computer-readable recording medium. The present invention particularly relates to a technique for providing, when an image abnormality occurs in an image processing apparatus, image data in which the image abnormality has occurred to an external apparatus.

Description of Related Art

An image processing apparatus such as a multifunction peripheral (MFP) executes various jobs such as a scan job, a print job, and a copy job. When these jobs are executed in the image processing apparatus, an image abnormality may occur. For example, in the case of a scan job, streaky image dirt may occur in image data generated by reading an image of a document (sheet). Similarly, in the case of a print job, streaky image dirt may occur in an image formed on a sheet such as a print sheet. The image abnormality occurring in the image processing apparatus is not limited to the streaky image dirt, and other various abnormalities occur.

On the other hand, in recent years, remote maintenance work is performed by a service person stationed at a service base making a call or the like with a user of an image processing apparatus via a telephone line. The service person specifies the cause of the trouble occurring in the image processing apparatus through a call with the user, and guides the user to perform component replacement or cleaning by himself/herself, or sends the service person for maintenance work.

However, when an image abnormality occurs in an image processing apparatus, it is difficult for a user without specialized knowledge to appropriately explain a symptom of the image abnormality. An expression related to image abnormality tends to be abstract, and is different for each person. Therefore, it is difficult for a service person to specify the cause of the image abnormality only through a call with the user.

Therefore, it is desirable to transmit image data to an external apparatus at a service base so that an actual image can be diagnosed at the service base. However, in a case where the document in which the image abnormality has occurred is a confidential document, it is not preferable to transmit the image data to the external apparatus in terms of security.

For example, Patent Literature 1 (JP2018-142881A) describes an image processing apparatus that, when transmitting a preview image displayed on an operation panel to a service base, if the preview image includes confidential information, performs concealment processing on the confidential information and transmits the confidential information. However, even if the confidential information is concealed, there is a possibility that the confidential information is guessed from a portion which is not concealed. Therefore, even if confidential information is concealed, it is not preferable to transmit image data including confidential information to the outside.

SUMMARY OF THE INVENTION

In order to solve the above-described conventional problem, an object of the present invention is to provide an image processing apparatus, a control method, and a non-transitory computer-readable recording medium that can reliably prevent leakage of confidential information when providing image data including an image abnormality to an external apparatus.

First, in order to achieve the above object, the present invention is directed to an image processing apparatus.

In one aspect of the present invention, the image processing apparatus includes: an image reading section for reading an image of a document to generate image data including image abnormality; and a hardware processor. The hardware processor performs: transmitting the image data to an external apparatus; determining whether or not the image data includes confidential information; when it is determined that the image data includes confidential information, saving the image data in a predetermined storage section without transmitting the image data to the external apparatus; and when the image data is saved in the storage section, transmitting access information for accessing the image data saved in the storage section to the external apparatus.

Second, the present invention is directed to a method of control method an image processing apparatus.

In one aspect of the present invention, the control method includes: reading an image of a document to generate image data including an image abnormality; transmitting the image data to an external apparatus; determining whether or not the image data includes confidential information; when it is determined that the image data includes confidential information, saving the image data in a predetermined storage section without transmitting the image data to the external apparatus; and when the image data is saved in the storage section, transmitting access information for accessing the image data saved in the storage section to the external apparatus.

Third, the present invention is directed to a non-transitory computer-readable recording medium storing a program to be executed in an image processing apparatus.

In one aspect of the present invention, a program recorded on the recording medium causes the image processing apparatus to perform: reading an image of a document to generate image data including an image abnormality; transmitting the image data to an external apparatus; determining whether or not the image data includes confidential information; when it is determined that the image data includes confidential information, saving the image data in a predetermined storage section without transmitting the image data to the external apparatus; and when the image data is saved in the storage section, transmitting access information for accessing the image data saved in the storage section to the external apparatus.

BRIEF DESCRIPTION OF THE DRAWINGS

The advantages and features provided by one or more embodiments of the invention will become more fully understood from the detailed description given herein below and the appended drawings which are given by way of illustration only, and thus are not intended as a definition of the limits of the present invention.

DETAILED DESCRIPTION OF THE EMBODIMENTS

Hereinafter, one or more embodiments of the present invention will be described with reference to the drawings. However, the scope of the invention is not limited to the disclosed embodiments.

Hereinafter, preferred embodiments of the present invention will be described in detail with reference to the drawings. Note that elements common to the embodiments described below are denoted by the same reference signs, and redundant description thereof is omitted.

PREFERRED EMBODIMENTS

Figure 1:
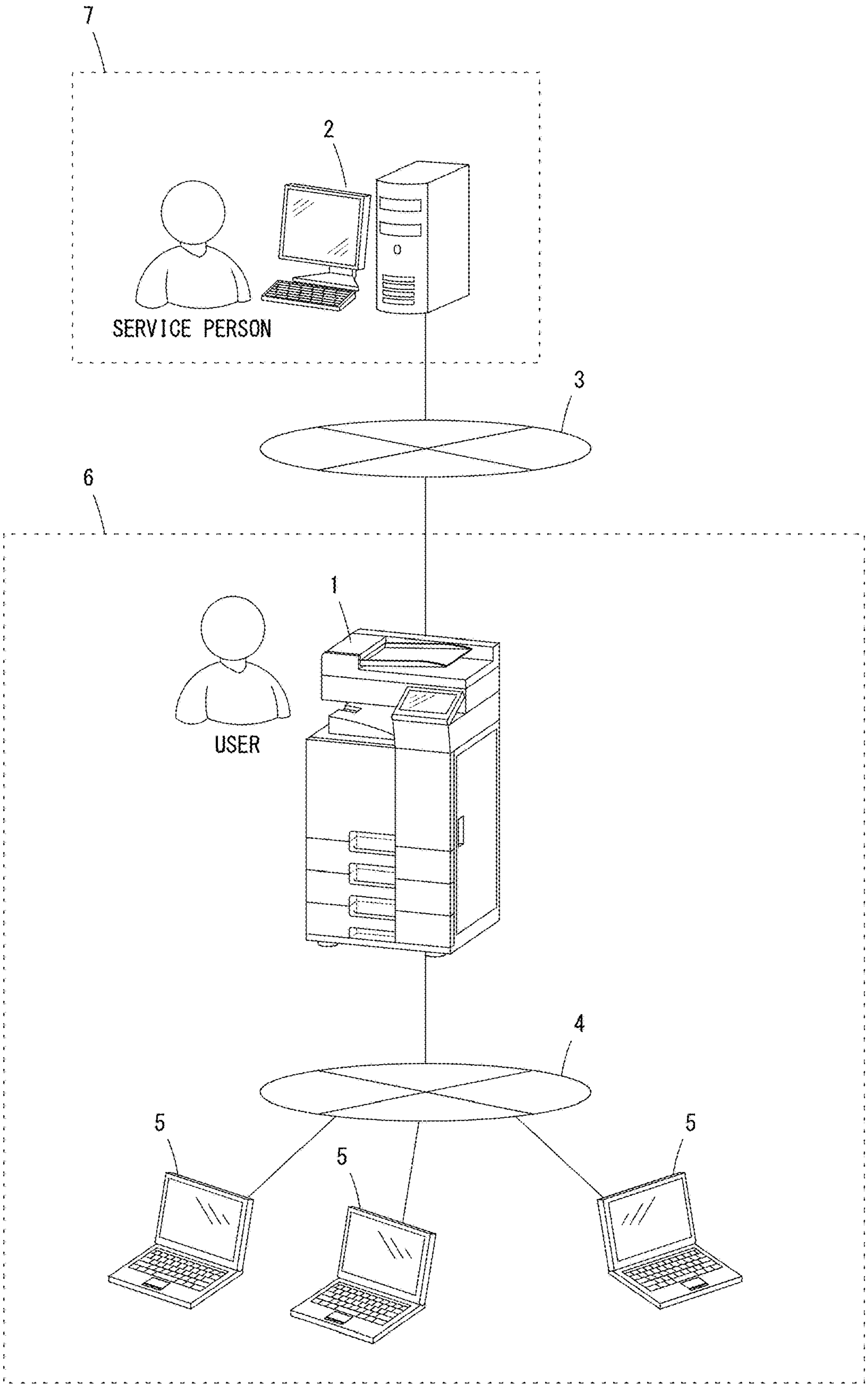
FIG. 1 illustrates an example of the configuration of a network system including image processing apparatus.

FIG. 1 illustrates an example of the configuration of a network system including an image processing apparatus 1 according to an embodiment of the present invention. This network system is a system in which an image processing apparatus 1 installed in a local environment 6 of a user and an image diagnostic apparatus 2 installed in a remote service base 7 can communicate with each other via a network 3 such as the Internet. For example, the image diagnostic apparatus 2 includes a personal computer (PC). The image diagnostic apparatus 2 is an external apparatus installed at a service base 7 different from a local environment 6 in which the image processing apparatus 1 is installed.

In the local environment 6, a local network 4 such as a local area network (LAN) is installed. The image processing apparatus 1 and a plurality of information processing apparatuses 5 are connected to the local network 4.

The image processing apparatus 1 is an MFP or the like, and executes various jobs such as a scan job, a print job, and a copy job. For example, in the case of a scan job, the image processing apparatus 1 reads an image of a document set by a user, generates image data, and outputs the image data. Furthermore, when receiving a print job from the information processing apparatus 5 via the local network 4, the image processing apparatus 1 executes the print job. The image processing apparatus 1 forms an image on a sheet, such as a print sheet, based on image data to be printed specified in a print job, and outputs the sheet. Furthermore, in the case of a copy job, the image processing apparatus 1 reads an image of a document set by a user to generate image data, forms an image based on the image data on a sheet, and outputs the sheet.

In this way, the image processing apparatus 1 outputs an image by executing a job. The user checks the image output from the image processing apparatus 1 to determine whether or not the job has been normally executed in the image processing apparatus 1. For example, when dirt, a bright spot, or streaky dirt adheres to the image output from the image processing apparatus 1, a user determines that image abnormality has occurred. When the user confirms the image abnormality, the user contacts a service person at the service base 7 and performs work for eliminating the image abnormality. For example, the user switches the operation mode of the image processing apparatus 1 from the normal job mode to the remote maintenance mode, and transmits image data in which an image abnormality has occurred to the image diagnostic apparatus 2 at the service base 7.

A service person at the service base 7 checks the image displayed on the image diagnostic apparatus 2 and specifies the cause of the image abnormality in the image processing apparatus 1. Based on the specified cause of the occurrence of the image abnormality, the service person guides the user to replace or clean a component, or sends another service person to the local environment 6 for maintenance work.

Figure 2:
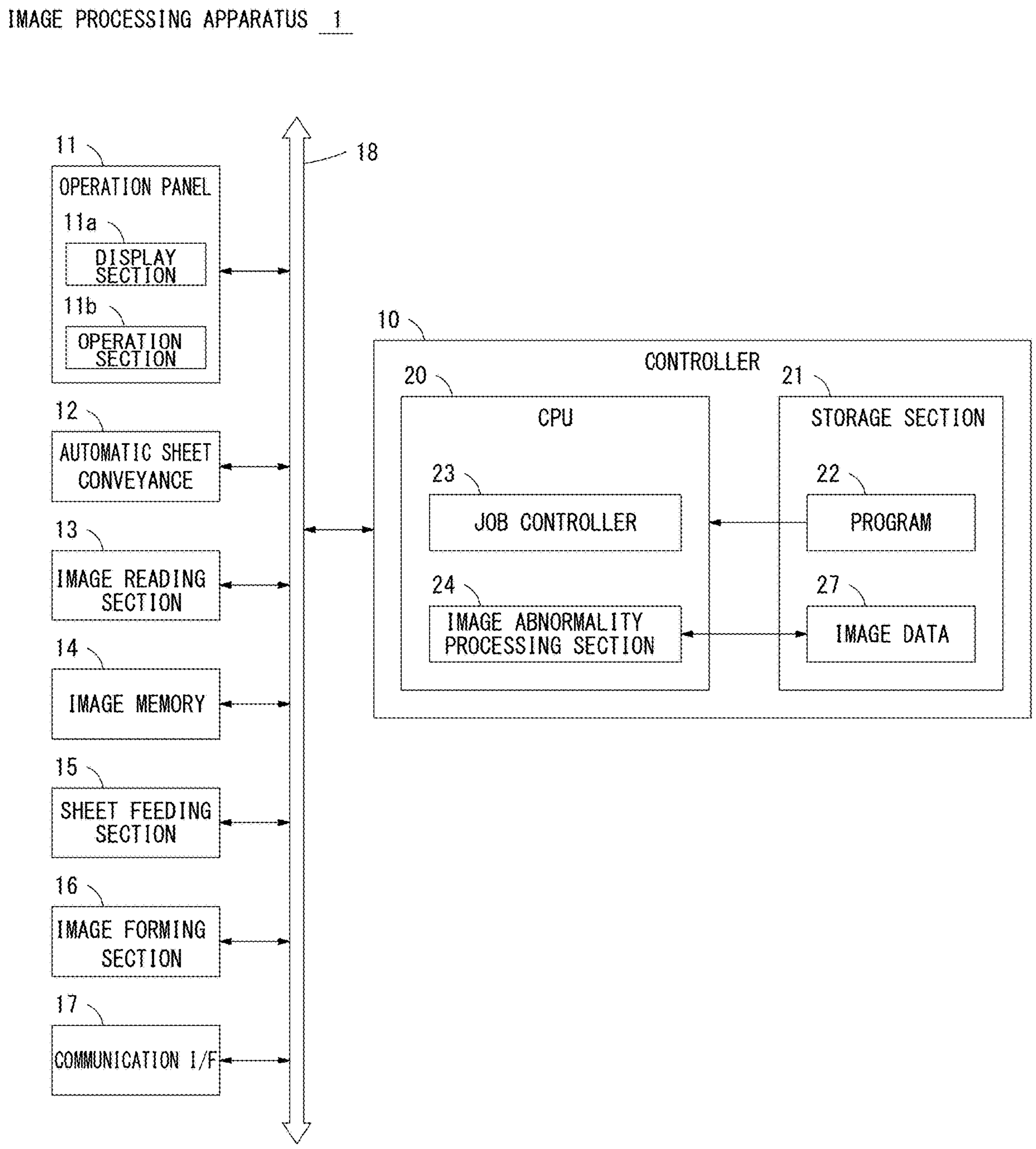
FIG. 2 is a block diagram illustrating an example of the configuration of an image processing apparatus.

FIG. 2 is a block diagram illustrating an example of a configuration of the image processing apparatus 1. The image processing apparatus 1 includes a controller 10, an operation panel 11, an automatic sheet conveyance 12, an image reading section 13, an image memory 14, a sheet feeding section 15, an image forming section 16, and a communication interface 17, all of which can input and output data to each other via a bus 18.

The controller 10 includes a CPU20 and a storage section 21, and comprehensively controls operation of the image processing apparatus 1. The CPU20 is a hardware processor that reads and executes the program 22 stored in the storage section 21. The storage section 21 is a nonvolatile storage apparatus that stores a program 22. The storage section 21 can store image data 27 in which an image abnormality has occurred, in addition to the program 22.

The operation panel 11 is a user interface for a user to use the image processing apparatus 1. The operation panel 11 includes a display section 11*a* for displaying various screens and an operation part 11*b* for receiving a user operation. The display section 11*a* is configured by, for example, a color liquid-crystal display. The operation section 11*b* includes, for example, touch panel keys disposed on a screen of the display section 11*a*.

The automatic sheet conveyance 12 and the image reader 13 operate when a scan job or a copy job is executed in the image processing apparatus 1. The automatic sheet conveyance 12 automatically feeds a document set by a user. The image reading section 13 reads an image of a document set by a user to generate image data. The image reading section 13 can automatically read an image of a document fed by the automatic sheet conveyance 12 in conjunction with a document feeding operation by the automatic sheet conveyance 12. For example, when continuous automatic feeding of a plurality of sheets in a document is performed by the automatic sheet conveyance 12, the image reading section 13 can continuously and automatically read the images of the multiple sheets in the document.

The image memory 14 is a memory that stores image data generated by execution of a job or image data to be printed.

The image memory 14 has a sufficiently large data capacity and can store a plurality of pieces of image data.

The sheet feeding section 15 and the image forming section 16 operate when a print job or a copy job is executed in the image processing apparatus 1. The sheet feeding section 15 feeds a sheet such as a print sheet and conveys the sheet to the image forming section 16. The image forming section 16 forms an image based on the print target image data on the sheet fed by the sheet feeding section 15, fixes the image on the sheet, and outputs the sheet.

The communication interface 17 is a communication section that connects the image processing apparatus 1 to the network 3 and the local network 4 to perform communication. The image processing apparatus 1 receives a print job transmitted from the information processing apparatus 5 via the communication interface 17. Furthermore, the image processing apparatus 1 communicates with the image diagnostic apparatus 2 at the service base 7 via the communication interface 17.

The CPU20 of the controller 10 functions as a job controller 23 and an image abnormality processing section 24 by executing the program 22. The job controller 23 is a controller that operates in the normal job mode, and controls the operations of a scan job, a copy job, and a print job.

The image abnormality processing section 24 operates when an image abnormality occurs as a result of execution of a job in the normal job mode and the operation mode is switched to the remote maintenance mode by a user. The image abnormality processing section 24 generates image data 27 of an image in which an image abnormality has occurred, and transmits the generated image data 27 to the image diagnostic apparatus 2 as an external apparatus. However, an image in which an image abnormality has occurred may include confidential information. When confidential information is included in the image in which the image abnormality has occurred, the image abnormality processing section 24 does not transmit the image data 27 to the external image diagnostic apparatus 2. That is, when the image in which the image abnormality occurs includes confidential information, the image abnormality processing section 24 stores the image data 27 in the storage section 21.

Figure 3:
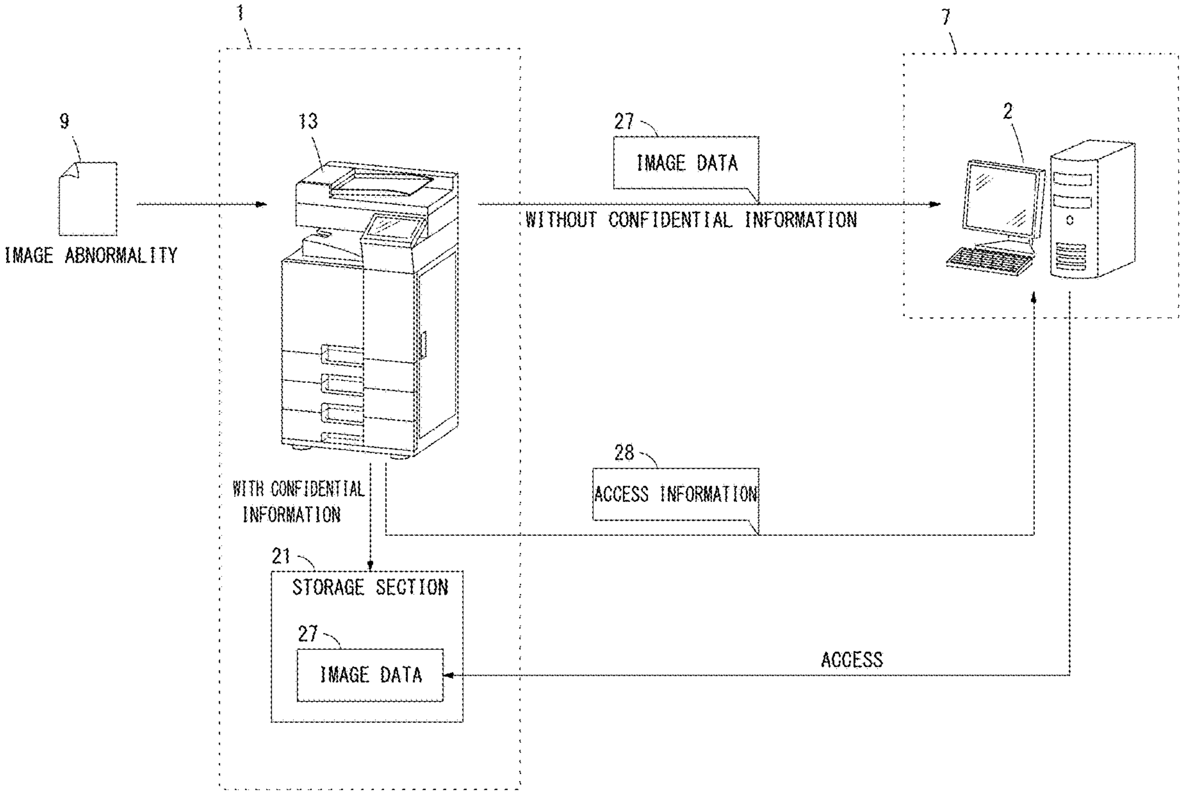
FIG. 3 illustrates a concept of processing by an image abnormality processing section.

FIG. 3 illustrates a concept of processing by the image abnormality processing section 24. Note that FIG. 3 illustrates a case where image abnormality has occurred in a print job or a copy job. When the operation of the remote maintenance mode is started, the image abnormality processing section 24 drives the image reading section 13, reads the image of the document 9 in which the image abnormality has occurred, and generates the image data 27 including the image abnormality. Upon generating the image data 27, the image abnormality processing section 24 determines whether or not confidential information is included in the image data 27. When the confidential information is not included in the image data 27, the image abnormality processing section 24 transmits the image data 27 including the image abnormality to the external image diagnostic apparatus 2 as it is. Upon receiving the image data 27 from the image abnormality processing section 24, the image diagnostic apparatus 2 displays an image including an image abnormality based on the image data 27. Accordingly, the service person can specify the cause of the image abnormality in the image processing apparatus 1 by checking the image including the image abnormality.

On the other hand, when confidential information is included in the image data 27, the image abnormality processing section 24 saves the image data 27 including the image abnormality in the storage section 21. That is, when the image data 27 includes confidential information, the image abnormality processing section 24 does not transmit the image data 27 to the external image diagnostic apparatus 2, thereby preventing the confidential information from leaking to the outside. After saving the image data 27 in the storage section 21, the image abnormality processing section 24 generates access information 28 for the external image diagnostic apparatus 2 to access the image data 27 in the storage section 21. Then, the image abnormality processing section 24 transmits the access information 28 to the image diagnostic apparatus 2. Therefore, when confidential information is included in the image data 27, the image diagnostic apparatus 2 does not receive the image data 27 from the image processing apparatus 1, but receives only the access information 28. For example, the access information 28 is information such as a uniform resource locator (URL) for accessing the image data 27 saved in the storage section 21 of the image processing apparatus 1. The service person operates the image diagnostic apparatus 2 to access the image data 27 in the storage section 21 based on the access information 28. Upon detecting access from the image diagnostic apparatus 2, the image abnormality processing section 24 generates a screen on which the image data 27 saved in the storage section 21 browsable, and provides the screen to the image diagnostic apparatus 2. The image diagnostic apparatus 2 displays the browsing screen. Thus, a service person can specify the cause of the image abnormality by checking the image displayed as the browsing screen.

Figure 4:
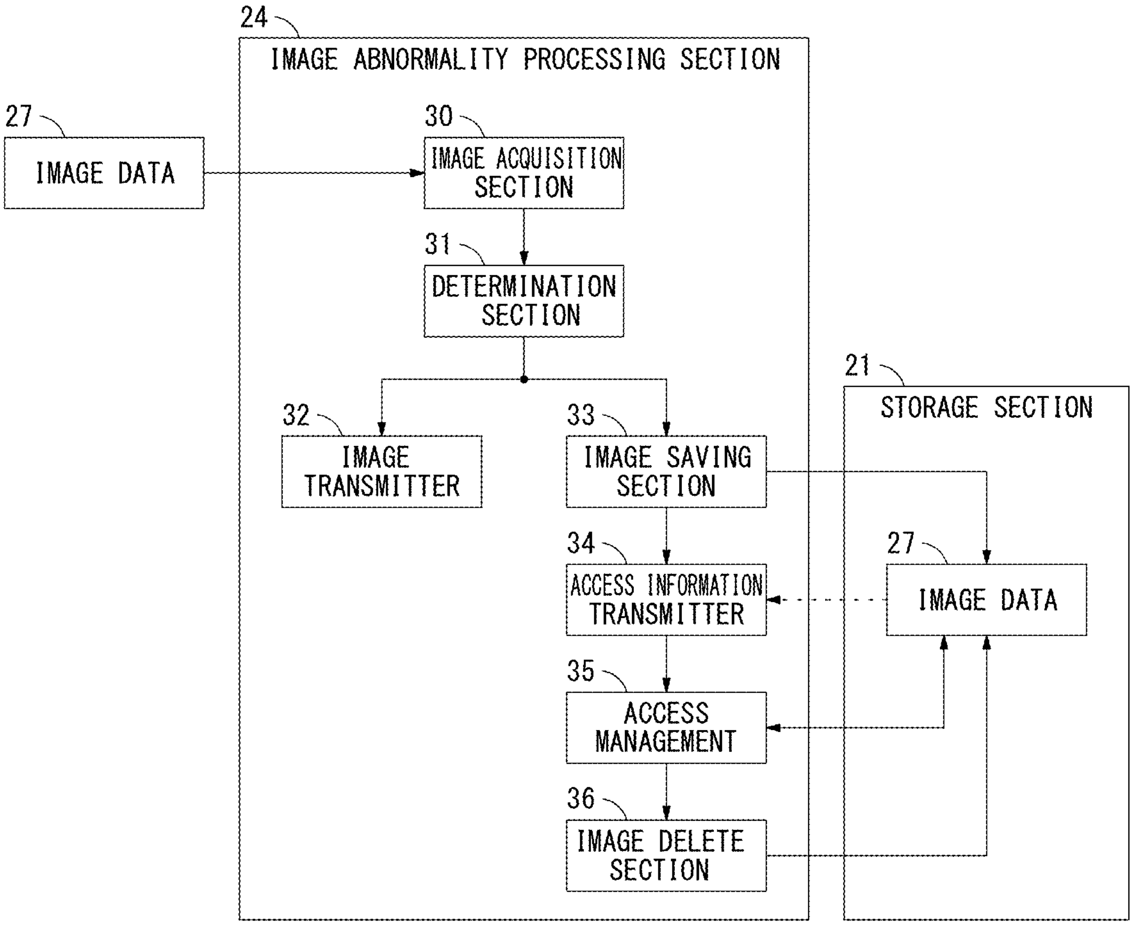
FIG. 4 is a block diagram illustrating a detailed functional configuration of an image abnormality processing section.

FIG. 4 is a block diagram illustrating a detailed functional configuration of the image abnormality processing section 24. The image abnormality processing section 24 includes an image acquisition section 30, a determination section 31, an image transmitter 32, an image saving section 33, an access information transmitter 34, an access management 35, and an image delete section 36.

The image acquiring section 30 acquires the image data 27 in which an image abnormality has occurred. For example, the image acquisition section 30 acquires the image data 27 including the image abnormality by driving the image reading section 13 to read the image of the document 9 in which the image abnormality has occurred.

The determination section 31 determines whether or not the image data 27 includes confidential information. For example, the determination section 31 analyzes the image data 27 and determines whether or not the image data 27 includes a specific character string such as "confidential" or "CONFIDENTIAL". When the specific character string is included in the image data 27, the determination section 31 determines that confidential information is included in the image data 27. When the specific character string is not included in the image data 27, the determination section 31 determines that the confidential information is not included in the image data 27.

The determination section 31 may determine, based on an instruction operation by the user, whether or not the image data 27 includes confidential information. For example, the determination section 31 displays, on the display section 11*a* of the operation panel 11, a screen asking the user whether or not the image includes confidential information. The determination section 31 determines, based on a user's operation on the screen, whether or not the image data 27 includes confidential information. For example, when the determination section 31 determines that the image data 27 does not include a specific character string and that the image data 27 does not include confidential information, the determination section 31 preferably displays, on the display section 11*a* of the operation panel 11, a screen for asking the user whether or not the image data 27 includes confidential information. Thus, even in a case where it is not possible to accurately determine whether or not confidential information is included only by searching for a specific character string, the determination section 31 makes a determination based on an instruction operation by the user, and thus it is possible to prevent leakage of confidential information.

When the determination section 31 determines that the image data 27 does not include confidential information, the image abnormality processing section 24 brings the image transmitter 32 into operation. The image transmitter 32 transmits the image data 27 not including confidential information to the image diagnostic apparatus 2 via the communication interface 17. For example, the image transmitter 32 transmits the image data 27 in a file format such as PDF, JPEG, or GIF.

On the other hand, when the determination section 31 determines that the image data 27 contains confidential information, the image abnormality processing section 24 brings the image saving section 33, access information transmitter 34, access management 35, and image delete section 36 into operation.

The image saving section 33 saves the image data 27 acquired by the image acquiring section 30 in the storage section 21. Furthermore, the image saving section 33 can change the saving destination of the image data 27 to a saving destination different from the storage section 21 based on a user's instruction operation. For example, the user may designate a storage installed in the local environment 6 as the saving destination of the image data 27. Provided that even inside the local environment 6, confidential information is more likely to be leaked if the image data 27 is saved outside the image processing apparatus 1. Therefore, it is preferable that the image saving section 33 provides a warning to the user when the storage outside the image processing apparatus 1 is designated as the saving destination by the user. Furthermore, the image saving section 33 may prohibit an external storage of the image processing apparatus 1 from being designated as a saving destination.

When saving the image data 27 in the storage section 21, the image saving section 33 saves the image data 27 in a state where copying of the image data 27 is prohibited. The image storage part 33 prevents the image data 27 including confidential information from being illegally acquired by prohibiting the duplication of the image data 27.

The access information transmitter 34 generates access information 28 for accessing the image data 27 saved by the image saving section 33, and transmits the access information 28 to the image diagnostic apparatus 2 designated in advance. Thus, the image diagnostic apparatus 2 can access the image data 27 saved in the storage section 21 based on the access information 28.

The access management 35 manages external access to the image data 27 in the storage section 21. For example, when the access management 35 detects an access to the image data 27 from the outside, the access management 35 determines whether or not the apparatus of the access source is the image diagnostic apparatus 2 designated in advance. As a result, when the access is from the image diagnostic apparatus 2, the access management 35 permits the access. When the access is permitted, the access management 35 reads the image data 27, generates a browsing screen on which the image data 27 can be browsed, and provides the browsing screen to the image diagnostic apparatus 2. This browsing screen is generated as, for example, a Web page such as HTML (Hyper Text Markup Language). Further, the access management 35 permits only browsing of an image included in the browsing screen, and prohibits printing of the image and downloading of the image data 27. Therefore, the service person at the service base 7 can perform confirmation work of the image only on the browsing screen displayed on the image diagnostic apparatus 2. The service person can specify the cause of the image abnormality by checking the image on the browsing screen.

On the other hand, when the access from the outside is another apparatus different from the image diagnostic apparatus 2 designated in advance, the access management 5 restricts the access to the image data 27. For example, the access management 5 prohibits access to the image data 27. Therefore, even if the access information 28 transmitted from the access information transmitter 34 is acquired by another apparatus different from the image diagnostic apparatus 2, the image data 27 cannot be browsed on another apparatus.

The image delete section 36 deletes the image data 27 saved in the storage section 21 under predetermined conditions. For example, the image delete section 36 counts the number of times of external access to the image data 27 and deletes the image data 27 from the storage section 21 when the number of times of access exceeds a predetermined number of times. Furthermore, the image delete section 36 deletes the image data 27 from the storage section 21 when a storage period of the image data 27 in the storage section 21 exceeds a predetermined period. Deletion of the image data 27 by the image delete section 36 under predetermined conditions can prevent the confidential information from being kept saved in the storage section 21 for a long time.

Figure 5:
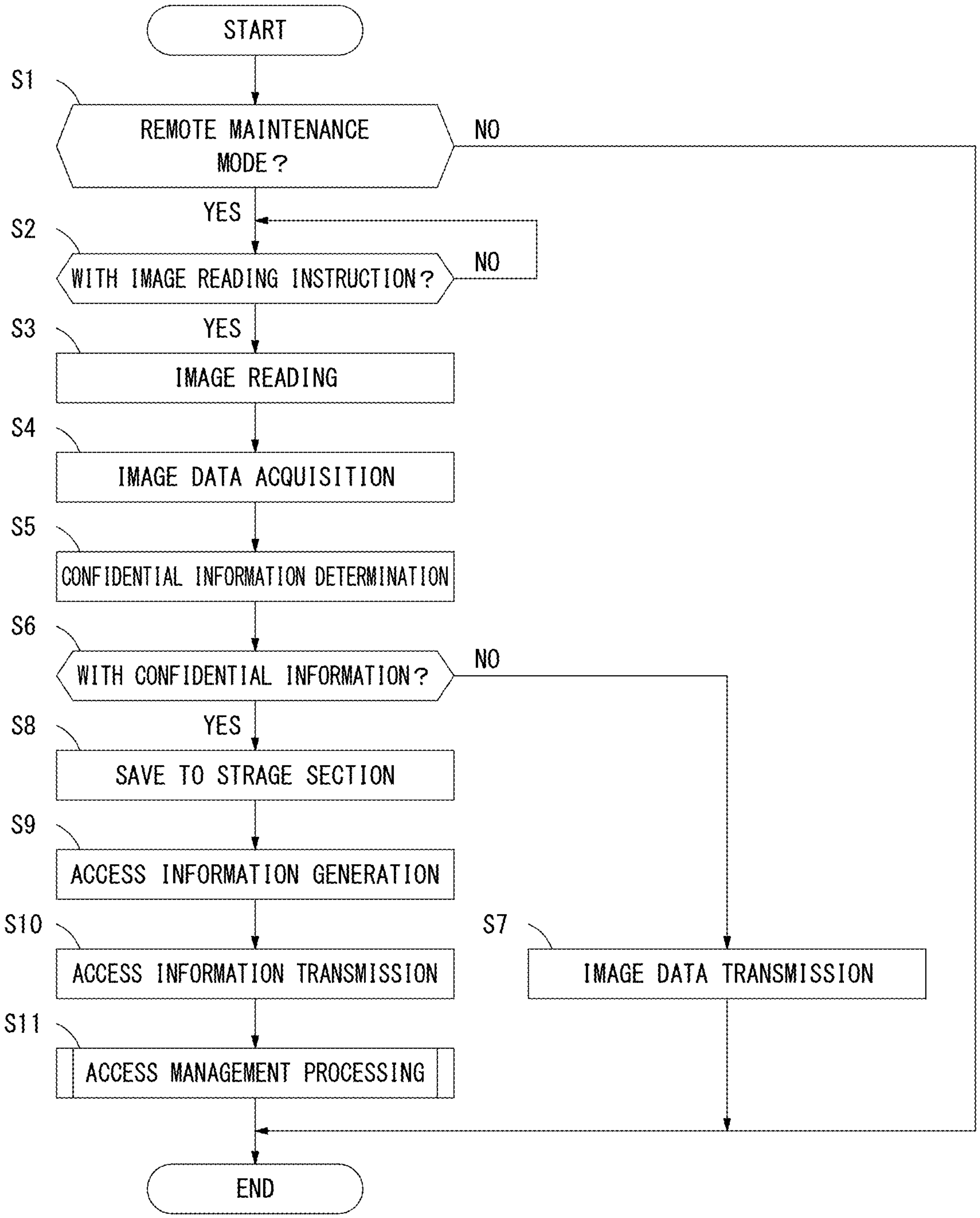
FIG. 5 is a flowchart illustrating a processing procedure of the image processing apparatus in a remote maintenance mode.

FIG. 5 is a flowchart illustrating a processing procedure of the image processing apparatus 1 in the remote maintenance mode. This processing procedure is performed by the CPU20 of the controller 10 executing the program 22. When starting this processing, the image processing apparatus 1 determines whether or not the mode has been switched to the remote maintenance mode (step S1). When the operation mode has not been switched to the remote maintenance mode (NO in step S1), the flowchart illustrated in FIG. 5 ends. On the other hand, when the mode has been switched to the remote maintenance mode (YES in step S1), the image processing apparatus 1 determines whether or not an image reading instruction by the user has been detected (step S2). In a case where the image reading instruction is detected (YES in step S2), the image processing apparatus 1 drives the image reading section 13, performs the reading operation of the document 9 including the image abnormality, and acquires the image date 27 (step S4).

Next, the image processing apparatus 1 determines whether or not confidential information is included in the image data 27 including the image abnormality (step S5). For example, the image processing apparatus 1 determines whether or not the image data 27 includes a specific character string. When the specific character string is included, the image processing apparatus 1 determines that the image data 27 includes confidential information. When the specific character string is not included, the image processing apparatus 1 displays, on the display section 11*a* of the operation panel 11, a screen for inquiring of the user whether or not the image includes confidential information. When the user designates an image that does not include confidential information in response to the screen, the image processing apparatus 1 determines that the image data 27 does not include confidential information. On the other hand, when the user designates an image including confidential information, the image processing apparatus 1 determines that the image data 27 includes confidential information.

When it is determined that the image date 27 does not include confidential information (NO in step S6), the image processing apparatus 1 transmits the image date 27 to the image diagnostic apparatus 2 (step S7).

When the image processing apparatus 1 determines that the image date 27 includes confidential information (YES in step S6), the image processing apparatus 1 saves the image date 27 in the storage section 21 without transmitting the image date 27 (step S8). The image processing apparatus 1 generates the access information 28 for accessing the image data 27 saved in the storage section 21 (step S9), and transmits only the access information 28 to the image diagnostic apparatus 2 (step S10). After transmitting the access information 28, the image processing apparatus 1 performs access management processing (step S11).

Figure 6:
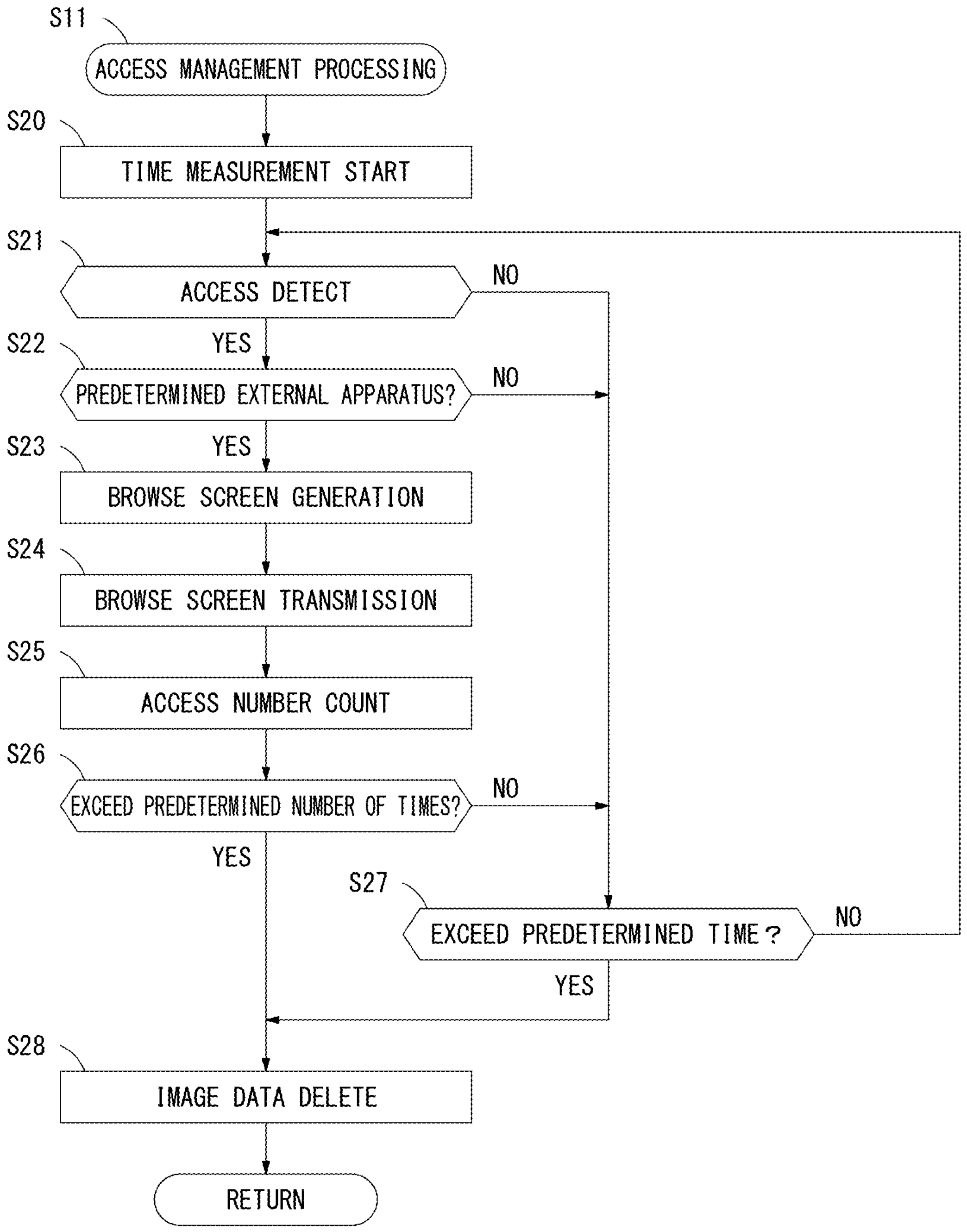
FIG. 6 is a flowchart illustrating an example of a detailed processing procedure of an access management processing.

FIG. 6 is a flowchart illustrating an example of a detailed processing procedure of access management processing (step S11). Upon start of the access management processing, the image processing apparatus 1 starts time measurement (step S20). By this time measurement, the storage period of the image data 27 is counted.

Next, the image processing apparatus 1 determines whether or not an external access to the image data 27 has been detected (step S21). When the access from the outside is detected (YES in step S21), the image processing apparatus 1 determines whether or not the access is from an external apparatus (image diagnostic apparatus 2) designated in advance (step S22). When the access source is the image diagnostic apparatus 2 (YES in step S22), the image processing apparatus 1 generates a browsing screen for browsing the image data 27 (step S23), and transmits the browsing screen to the image diagnostic apparatus 2 (step S24). Thus, a service person at the service base 7 can specify the cause of the image abnormality by checking the browsing screen displayed on the image diagnostic apparatus 2.

After transmitting the browsing screen, the image processing apparatus 1 updates the count value of the number of times of access to the image data 27 (step S25). The image processing apparatus 1 then determines whether or not the count value of the number of times of access has exceeded a predetermined number of times (step S26). When the count value of the number of times of access does not exceed the predetermined number of times (NO in step S26), the image processing apparatus 1 determines whether or not the saving period of the image data 27 exceeds a predetermined period (step S27). When the saving period does not exceed the predetermined period (NO in step S27), the process by the image processing apparatus 1 returns to step S21. Therefore, the service person at the service base 7 can access the image processing apparatus 1 and check the browsing screen until the number of times of access exceeds the predetermined number of times.

On the other hand, when the number of accesses exceeds the predetermined number of times (YES in step S26), or when the saving period of the image data 27 exceeds the predetermined period of time (YES in step S27), the image processing apparatus 1 deletes the image data 27 saved in the storage section 21 (step S28).

As described above, the image processing apparatus 1 according to the present embodiment includes the image reading section 13 reading an image of the document 9 including image abnormality to generate the image data 27 including image abnormality, and the image transmitter 32 transmitting the image data 27 to an external apparatus. The image processing apparatus 1 further includes a determination section 31, an image saving section 33, and an access information transmitter 34. The determination section 31 determines whether or not the image data 27 includes confidential information. When the determination section 31 determines that the confidential information is included, an image saving section 33 saves the image data 27 in a predetermined storage section 21 without transmitting the image data 27 to an external apparatus. When the image data 27 is saved in the storage section 21 by the image saving section 33, the access information transmitter 34 transmits, to the external apparatus, the access information 28 for accessing the image data 27 saved in the storage section 21.

When confidential information is included in the image data 27 including image abnormality, the image processing apparatus 1 having the above-described configuration saves the image data 27 in the storage section 21 without transmitting the image data 27 to the external apparatus. That is, since the image processing apparatus 1 does not transmit confidential information to an external apparatus outside the local environment 6, it is possible to prevent leakage of confidential information. Further, the image processing apparatus 1 transmits access information 28 for accessing the image data 27 saved in the storage section 21 to the external apparatus. Therefore, the external apparatus can access the image processing apparatus 1 from the service base 7 to acquire and display the browsing screen from the image processing apparatus 1. The browsing screen includes an image corresponding to the image data 27. Therefore, a service person at the service base 7 can specify the cause of the image abnormality by checking the browsing screen.

Incidentally, when the image processing apparatus 1 generates the browsing screen, if the image based on the image data 27 is included in the browsing screen as it is, there is a possibility that confidential information is transmitted to the external apparatus. Therefore, when the image storage section 33 saves the image data 27 in the storage section 21, it is preferable that the image saving section 33 process an area including confidential information in the image data 27 into a non-browsable state and save the image data 27.

Figure 7A:
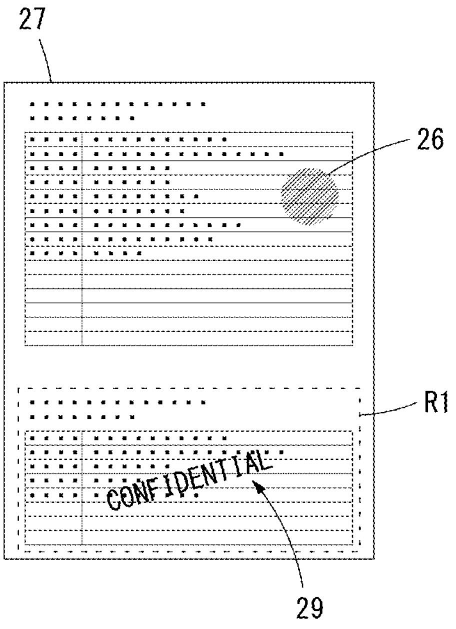
FIGS. 7A and 7B illustrate an example of processing of an area including confidential information.
Figure 7B:
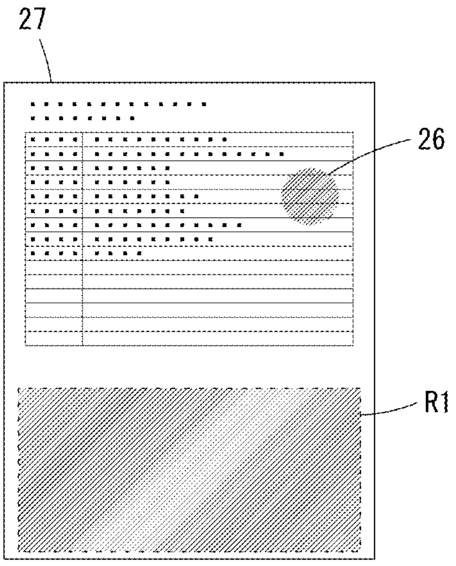

FIG. 7A and FIG. 7B illustrate examples of processing of an area R1 including confidential information. For example, as illustrated in FIG. 7A, the image data 27 includes an area R1 determined to be confidential information by a specific character string 29. That is, the area R1 is an area including confidential information. Further, the image data 27 has an image abnormality 26 such as a stain in a portion other than the area R1 including the confidential information. When saving the image date 27 illustrated in FIG. 7A in the storage section 21, the image saving section 33 processes the area R1 including the confidential information. To be specific, the image saving section 33 generates the image date 27 illustrated in FIG. 7A from the image date 27 illustrated in FIG. 7B. In the image data 27 illustrated in FIG. 7B, the area R1 including the confidential information is processed so that the confidential information is not allowed to be browsed. The process of the processing the area R1 includes, for example, processing of filling the area R1 with a predetermined color and processing of overwriting with other date that does not include confidential information. Furthermore, the image saving section 33 may perform scrambling on the area R1. The image saving section 33 processing the area R1 including the confidential information into a non-browsable state can surely prevent the confidential information from being leaked when the browsing screen is provided to the outside.

Note that the image saving section 33 may specify the area designated by the user as the area R1 including confidential information. In this case, the image saving section 33 displays a preview image based on the image date 27 on the display section 11*a* of the operation panel 11, and specifies an area designated by the user for the preview image as the area R1 including the confidential information.

Figure 8:
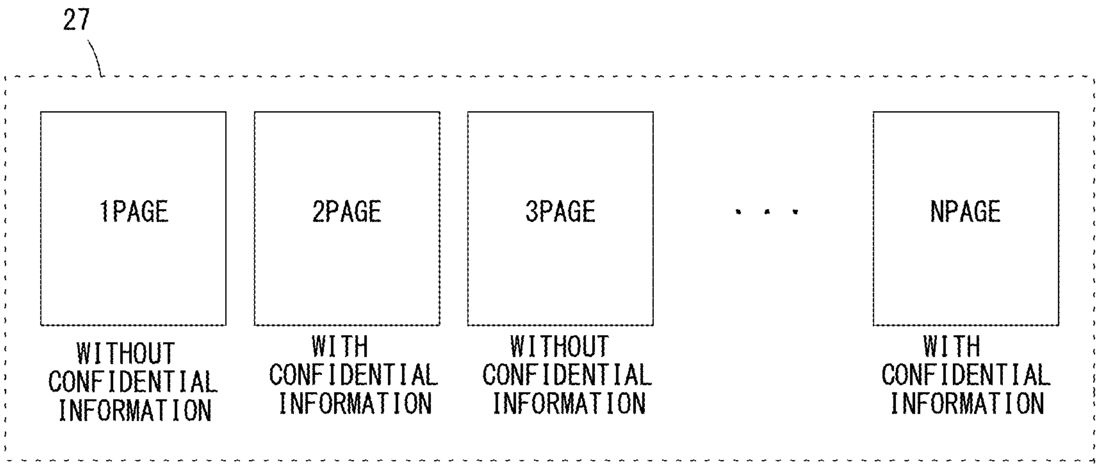
FIG. 8 illustrates an image data including images for a plurality of pages.

The image data 27 acquired by the image acquiring section 30 may include images of a plurality of pages. When the image data 27 includes images of a plurality of pages, the determination section 31 determines, for each page, whether or not the page includes confidential information. FIG. 8 illustrates image data 27 including images for a plurality of pages. The determination section 31 determines, for each page, the page includes confidential information. Then, as illustrated in FIG. 8, the plurality of images included in the image data 27 are sorted into images of pages including confidential information and images of pages not including confidential information. In the example of FIG. 8, the image of the first page and the image of the third page are detected as images including no confidential information, and the image of the second page and the image of the N-th page are detected as images including confidential information.

Figure 9:
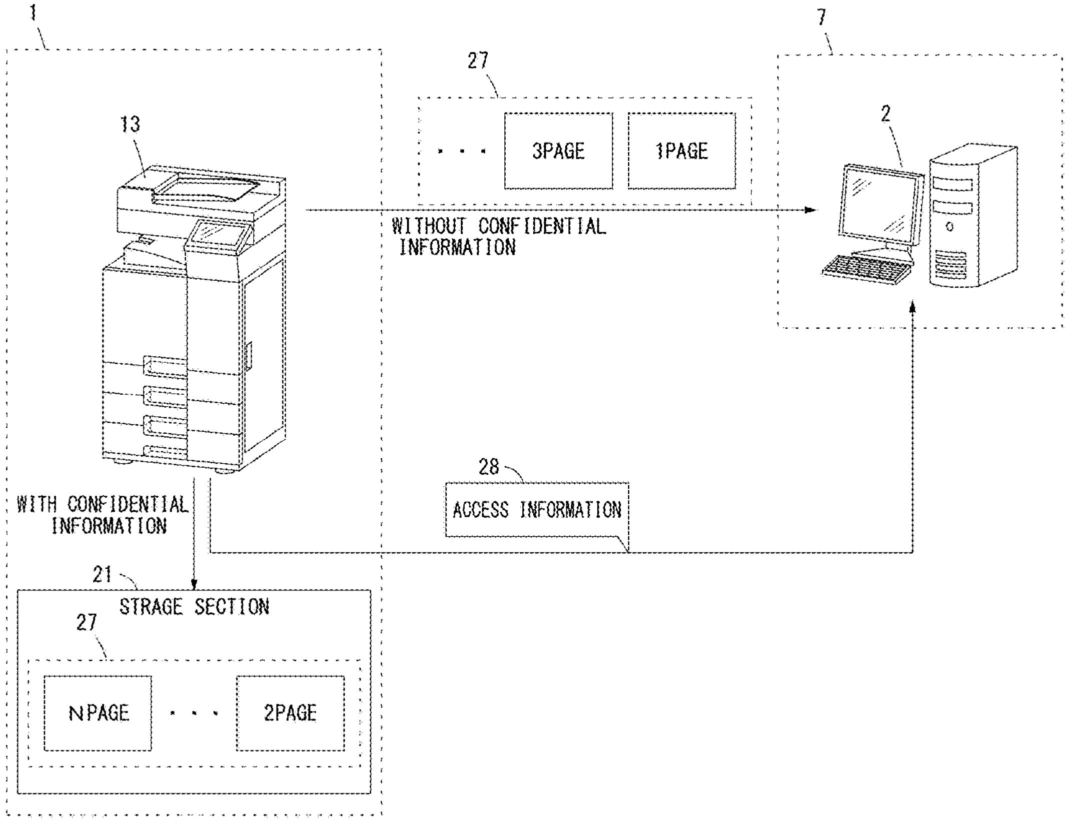
FIG. 9 illustrates a concept of processing by an image abnormality processing section in a case where image data includes an image of a page including confidential information and a page image not including confidential information.

In a case where the image data 27 includes an image of a page including confidential information and an image of a page not including confidential information, for example, the image abnormality processing section 24 causes both the image transmitter 32 and the image saving section 33 to function. FIG. 9 illustrates the concept of processing by the image abnormality processing section 24 in a case where image data 27 includes an image of a page including confidential information and an image of a page not including confidential information. As illustrated in FIG. 9, the image transmitter 32 extracts an image of a page that does not include confidential information from the image data 27, and transmits the extracted image to the image diagnostic apparatus 2. The image saving section 33 extracts an image of a page including confidential information from the image data 27, and saves the image in the storage section 21. At this time, the image storage section 33 processes the area R1 including the confidential information into a non-browsable state and saves it. The access information transmitter 34 generates access information 28 for accessing the image data 27 saved in the storage section 21 and transmits the access information 28 to the image diagnostic apparatus 2. The image diagnostic apparatus 2 acquires the image of the page not including the confidential information from the image processing apparatus 1 and displays it. The image diagnostic apparatus 2 also accesses the image processing apparatus 1 based on the access information 28 to acquire and display an image of a page including confidential information as a browsing screen. Therefore, if the service person can specify the cause of the image abnormality from the image of the page that does not include the confidential information and that is directly acquired from the image processing apparatus 1 by the image diagnostic apparatus 2, the service person can efficiently specify the cause of the image abnormality without accessing the image processing apparatus 1 to acquire the browsing image.

Hereinabove, a preferred embodiment of the present invention has been described. However, the present invention is not limited to that described in the above embodiment, and various modification examples are applicable.

For example, in the above-described embodiment, the case where an image abnormality occurs mainly in a print job or a copy job has been described. However, image abnormality may also occur in a scan job. For example, when an image of a document is read in a scan job, image data 27 is stored in the image memory 14. The image processing apparatus 1 can read the image data 27 and display a preview of the image data 27 on the display section 11*a* of the operation panel 11. The user recognizes that an image abnormality has occurred by checking the preview display, and switches the image processing apparatus 1 to the remote maintenance mode. At this time, the image abnormality processing section 24 can acquire the image data 27 including the image abnormality by reading the image data 27 temporarily saved in the image memory 14.

Further, the program 22 described in the above embodiment is not limited to a program stored in advance in the storage section 21 of the image processing apparatus 1. For example, the program 22 may be a transaction target by itself. In this case, the program 22 may be provided in a mode of being downloadable via a network such as the Internet, or may be provided in a state of being recorded in a computer-readable recording medium such as a CD-ROM.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus, comprising:

an image reading section for reading an image of a document to generate image data including image abnormality; and a hardware processor, wherein the hardware processor executes;

transmitting the image data to an external apparatus;

determining whether or not the image data includes confidential information;

when it is determined that the image data includes confidential information, saving the image data in a predetermined storage section without transmitting the image data to the external apparatus; and when the image data is saved in the storage section, transmitting access information for accessing the image data saved in the storage section to the external apparatus.

2. The image processing apparatus according to claim 1, wherein when the image data includes confidential information, the hardware processor processes an area of the image data including the confidential information into a non-browsable state, and saves the processed area in the storage section.

3. The image processing apparatus according to claim 1, wherein the hardware processor counts the number of times of access to the image data saved in the storage section, and deletes the image data from the storage section when the number of times of access exceeds a predetermined number of times.

4. The image processing apparatus according to claim 1, wherein the hardware processor deletes the image data from the storage section when a saving period of the image data in the storage section has exceeded a predetermined period.

5. The image processing apparatus according to claim 1, wherein the hardware processor saves the image data in the storage section in a state where duplication of the image data is prohibited.

6. The image processing apparatus according to claim 1, wherein the hardware processor determines, based on an instruction operation by a user, whether or not the image data includes confidential information.

7. The image processing apparatus according to claim 1, wherein the hardware processor analyzes the image data to automatically determine whether or not the image data includes confidential information.

8. The image processing apparatus according to claim 1, wherein when the image data includes images of multiple pages, the hardware processor determines, for each page, whether or not confidential information is included, extracts an image of a page including confidential information from the image data, and saves the image in the storage section.

9. The image processing apparatus according to claim 1, wherein the hardware processor extracts an image of a page that does not include confidential information from the image data, and transmits the image to the external apparatus.

10. The image processing apparatus according to claim 1, wherein the hardware processor saves the image data in the storage section based on an instruction operation by a user.

11. The image processing apparatus according to claim 1, wherein the hardware processor restricts access to the image data saved in the storage section from apparatuses other than the external apparatus.

12. A method of controlling an image processing apparatus, comprising:

reading an image of a document to generate image data including an image abnormality;

transmitting the image data to an external apparatus;

determining whether or not the image data includes confidential information;

saving the image data in a predetermined storage section without transmitting the image data to the external apparatus when it is determined that confidential information is included in the image data; and transmitting access information for accessing the image data saved in the storage section to the external apparatus when the image data is saved in the storage section.

13. A non-transitory computer-readable recording medium in which a program to be executed in an image processing apparatus is recorded, the program causing the image processing apparatus to execute:

reading an image of a document to generate image data including an image abnormality;

transmitting the image data to an external apparatus;

determining whether or not the image data includes confidential information;

saving the image data in a predetermined storage section without transmitting the image data to the external apparatus when it is determined that confidential information is included in the image data; and transmitting access information for accessing the image data saved in the storage section to the external apparatus when the image data is saved in the storage section.

* * * * *